United States Patent
Qian et al.

(10) Patent No.: US 9,608,860 B1
(45) Date of Patent: Mar. 28, 2017

(54) SYNCHRONIZED MME POOL

(71) Applicant: Affirmed Networks Communications Technologies, Inc., Acton, MA (US)

(72) Inventors: Haibo Qian, Frisco, TX (US); Fred Rink, Fairview, TX (US); Michael Brown, McKinney, TX (US)

(73) Assignee: AFFIRMED NETWORKS COMMUNICATIONS TECHNOLOGIES, INC., Acton, MA (US)

( * ) Notice: Subject to any disclaimer, the term of this patent is extended or adjusted under 35 U.S.C. 154(b) by 0 days.

(21) Appl. No.: 15/083,036

(22) Filed: Mar. 28, 2016

(51) Int. Cl.
| | |
|---|---|
| *H04L 12/24* | (2006.01) |
| *H04W 36/24* | (2009.01) |
| *H04W 36/08* | (2009.01) |
| *H04W 24/04* | (2009.01) |

(52) U.S. Cl.
CPC ......... *H04L 41/0668* (2013.01); *H04W 24/04* (2013.01); *H04W 36/08* (2013.01); *H04W 36/24* (2013.01)

(58) Field of Classification Search
None
See application file for complete search history.

(56) References Cited

U.S. PATENT DOCUMENTS

| | | | | |
|---|---|---|---|---|
| 2011/0235505 A1* | 9/2011 | Eswara | ................... | H04L 43/10 370/221 |
| 2012/0023360 A1* | 1/2012 | Chang | ................. | G06F 11/0709 714/4.11 |
| 2013/0188555 A1* | 7/2013 | Olsson | ................... | H04W 8/30 370/328 |
| 2015/0237539 A1* | 8/2015 | Guo | ................. | H04W 36/0033 370/331 |

FOREIGN PATENT DOCUMENTS

SE   WO 2013143831 A1 * 10/2013 ........ H04W 28/0247

OTHER PUBLICATIONS

3GPP TS 23.236, 3rd Generation Partnership Project; Technical Specification Group Services and System Aspects; Intra-domain Connection of Radio Access Network (RAN) Nodes to Multiple Core Network (CN) Nodes, V13.0.0 (Release 13), Jun. 2015, 41 pgs.
3GPP TS 23.401, 3rd Generation Partnership Project; Technical Specification Group Services and System Aspects; General Packet Radio Service (GPRS) Enhancements for Evolved Universal Terrestrial Radio Access Network (E-UTRAN) Access, V13.5.0 (Release 13), Dec. 15, 337 pgs.

* cited by examiner

*Primary Examiner* — Edan Orgad
*Assistant Examiner* — Saumit Shah
(74) *Attorney, Agent, or Firm* — Wilmer Cutler Pickering Hale and Dorr LLP (57) ABSTRACT

Example implementations are directed to systems and methods involving a mobility management entity (MME) pool. In example implementations, the MME of the pool can be configured as a backup for a fraction of subscribers associated with other MME in the pool. Upon detection of the failure of an MME in the pool, the surviving MME messages eNodeBs and other peer network nodes that it will take over the impacted subscribers such that the subscribers do not need to conduct a reattachment process. Multiple MME codes per MME can be used to partition the subscribers for backup, which can thereby lead to geo-redundancy for the MME.

20 Claims, 5 Drawing Sheets

SYNCHRONIZED MME POOL

BACKGROUND

Field

The present application is generally directed to wireless systems, and more specifically, to mobility management entity (MME) pools.

Related Art

The related art MME pooling concept developed by the 3$^{rd}$ Generation Partnership Project (3 GPP) allows an enhanced node B (eNodeB) to connect to multiple MME nodes in a pool. When one of the MME nodes in the pool fails, the subscribers on the failed MME may be required to re-attach to the other MMEs in the pool. The reattachment requirement can cause the loss of service for the subscribers as well as a large amount of signaling to restore service to the subscribers.

SUMMARY

In example implementations, there are systems and methods which facilitate the MMEs in the pool to take over the subscribers for the failed MME such that the impacted subscribers do not need to conduct a reattachment process. Systems and methods of the example implementations facilitate each MME in the pool to maintain information of a sub-set of subscribers of each every other MME in the pool. If the failure of an MME is detected, each of the remaining MMEs are configured to inform the eNodeBs that it has taken over part of the failed MME. From that point on, the messages related to the impacted subscribers are routed to the MME that takes over the subscribers. In such example implementations, the service to the impacted subscribers can continue without requiring the subscribers to re-attach to the network.

Aspects of the present disclosure can include a mobility management entity (MME), which may involve a memory configured to store a plurality of MME codes, each of the plurality of MME codes indicative of a primary MME for a user equipment (UE) and a secondary MME for the UE; and a processor, configured to: retrieve first subscriber information indicative of a plurality of first UE identifiers (IDs) corresponding to UEs that associate the MME as the primary MME; provide the first subscriber information to each secondary MME indicated in the plurality of MME codes; and retrieve second subscriber information indicative of a plurality of second UE IDs corresponding to UEs that associate the MME as the secondary MME.

Additional aspects of the present disclosure can include a method for a mobility management entity (MME), which can involve managing a plurality of MME codes, each of the plurality of MME codes indicative of a primary MME for a user equipment (UE) and a secondary MME for the UE; retrieving first subscriber information indicative of a plurality of first UE identifiers (IDs) corresponding to UEs that associate the MME as the primary MME; providing the first subscriber information to each secondary MME indicated in the plurality of MME codes; and retrieving second subscriber information indicative of a plurality of second UE IDs corresponding to UEs that associate the MME as the secondary MME.

Additional aspects of the present disclosure can include an apparatus for a mobility management entity (MME), which can involve means for managing a plurality of MME codes, each of the plurality of MME codes indicative of a primary MME for a user equipment (UE) and a secondary MME for the UE; means for retrieving first subscriber information indicative of a plurality of first UE identifiers (IDs) corresponding to UEs that associate the MME as the primary MME; means for providing the first subscriber information to each secondary MME indicated in the plurality of MME codes; and means for retrieving second subscriber information indicative of a plurality of second UE IDs corresponding to UEs that associate the MME as the secondary MME.

Example implementations disclosed herein can reduce the service interruption during an MME failure by allowing other MME nodes in the pool to backup a sub set of subscribers. Upon the failure of one MME, the other MME nodes in the pool provide uninterrupted service to the subscribers otherwise would need to re-attach to the network. The example implementations can achieve the goal without introducing additional MME nodes into pool.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. The term eNodeB may also be interchangeably used with small cell (SC), base station (BS) or radio station.

Example implementations of the present disclosure are directed to systems and methods to eliminate service impact when one of the MME nodes in an MME pool fails. The concept of MME pool is defined, for example by the 3 GPP specifications or by other standards depending on the desired implementation.

Figure 1:
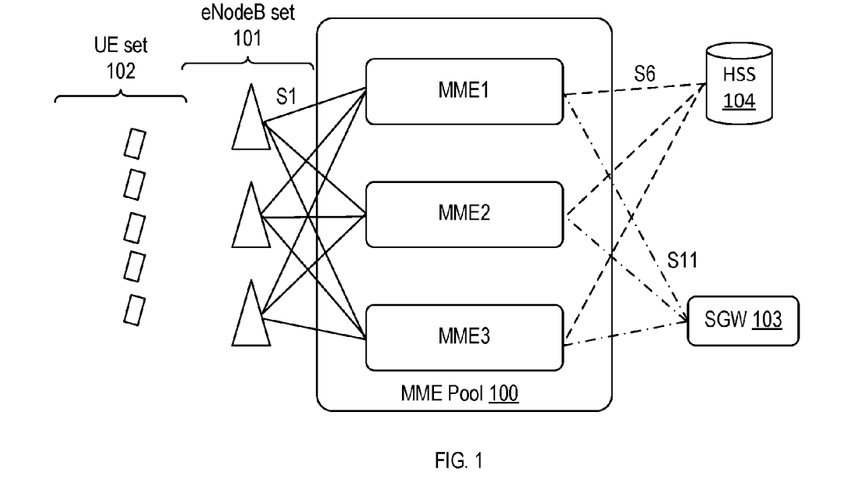
FIG. 1 illustrates an example network with a deployed MME pool, in accordance with an example implementation

FIG. 1 illustrates an example network with a deployed MME pool, in accordance with an example implementation. In the example of FIG. 1, there is a network which involves an MME pool 100 with three MME nodes (MME1, MME2, MME3), a set of eNodeBs 101 associated with the MME pool 100, and a set of user equipment (UE) 102 served by the MME pool 100. MME pool 100 may also be associated with a set of Serving Gateway (SGW) nodes 103 and a set of Home Subscriber Server (HSS) nodes 104. The network depicted may also contain other network nodes that are associated with the MME pool 100 in accordance with the desired implementation and is not limited thereto. The set of UEs 102 can include the mobile device subscribers configured to receive service from the network.

In example implementations, each MME in the pool is assigned multiple MME codes which is in contrast to related art implementations that utilize only one MME code per MME. The number of MME codes assigned to each MME in the pool can be determined based on the number of MME nodes in the pool. Let (N) denote the number of MME nodes in the pool. In an example implementation, the minimum number of MME codes assigned to each MME is (N—1). Multiples of (N—1) MME codes can be used if desired. Without loss of generality, example implementations described herein assume (N—1) MME codes per MME.

In example implementations, when an MME node fails, its (N—1d) MME codes are divided among the remaining (N—1) MME nodes. Each of the remaining MME nodes will take over one of the MME codes that belong to the failed MME. Each of the remaining MME nodes then updates its neighboring network nodes to indicate that it has taken over the responsibility of the MME code, thus ensuring that future signaling messages for the subscribers are directed to the correct MME nodes.

In example implementations, when an MME is in steady running state, the MME will synchronize the subscriber information to the other MME nodes in the pool. The synchronization of the subscriber information is also based on the MME code assigned. All the subscribers that are linked to a particular MME code are synchronized to one other MME node in the pool. This example implementation method allows each MME in the pool to back up a fraction of the subscribers of each of the other MME nodes in the pool. All the MME nodes in the pool can be configured with similar subscriber capacity in order to make sure there is room to synchronize from the other MME nodes.

Figure 2:
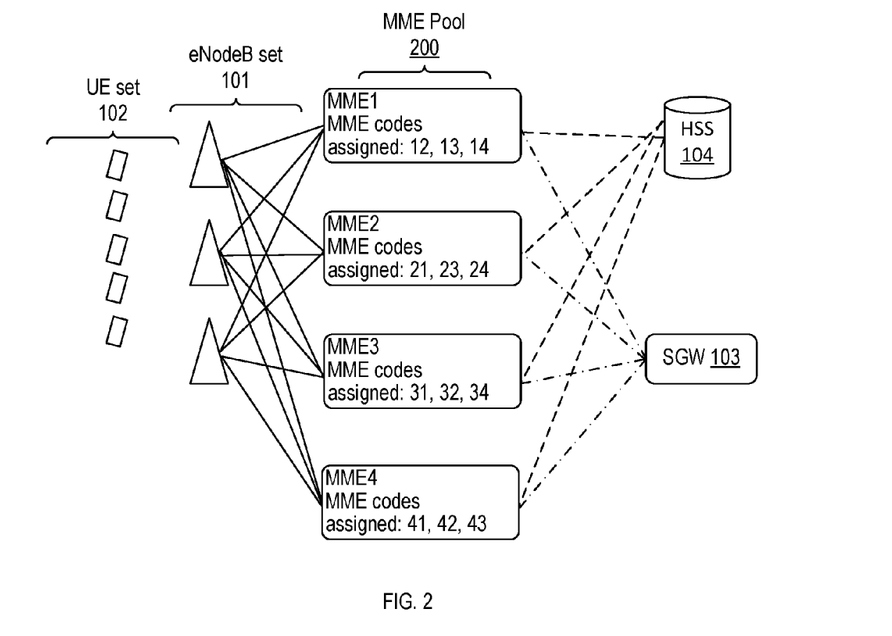
FIG. 2 illustrates an example network with a deployed MME pool, in accordance with an example implementation.

FIG. 2 illustrates an example network with a deployed MME pool, in accordance with an example implementation. The example implementation as illustrated in FIG. 2 takes the architecture of FIG. 1 and applies an MME pool 200 that involves four MME nodes (MME1, MME2, MME3, MME4) that is utilized as follows. With (N=4) nodes, each MME is assigned three MME codes. For ease of illustration, the following numbering convention is used:

The first digit of the MME code indicates the primary MME for the MME code

The second digit of the MME code indicates the backup MME for the MME code

For example, MME code 12 indicates that MME1 is the primary MME for subscribers assigned to MME code 12 and MME2 is the backup MME. Thus, in example implementations, the MME codes are utilized to designate both the primary MME and a corresponding backup MME within the MME pool. The example provided in FIG. 2 is for illustrative purposes, and any desired implementation can be utilized to facilitate the MME codes to be indicative of both the primary MME and the secondary MME.

With the above example implementation, when a subscriber attaches on the network for the first time, the associated eNodeB from the eNodeB set 101 selects an MME (e.g. based on a load balancing algorithm on the eNodeB, throughput requirements of the UE, and so on depending on the desired implementation) and route the message to the primary MME. The MME selects one of the MME codes assigned to the MME in a load-balancing manner to ensure the MME codes are evenly used. After the subscriber is successfully attached to the primary MME, the subscriber information is synchronized with the standby MME for the particular MME code used for the subscriber. The mechanism used to synchronize the subscriber information from one MME to another can be implemented in any method according to the desired implementation. The subscriber information being synchronized includes both the mobility related information such as the identities of the subscriber, current location, authentication vector and subscription information received from the HSS as well as session related information such as the internet protocol (IP) address of the user, identity of the SGW, and so on in accordance with the desired implementation.

Figure 3:
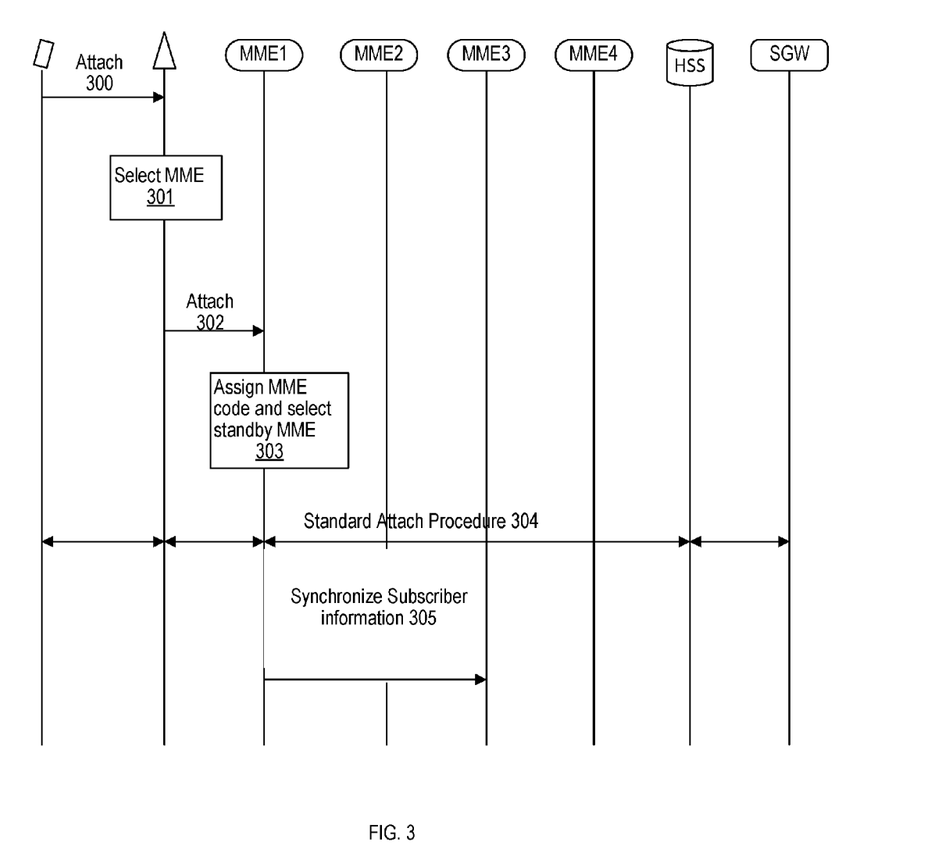
FIG. 3 illustrates a flow for an attachment procedure, in accordance with an example implementation.

FIG. 3 illustrates a flow for an attachment procedure, in accordance with an example implementation. Specifically, the flow of FIG. 3 is directed to an attachment procedure involving a synchronized MME pool.

When a subscriber attaches to the network at 300, the MME assigns a globally unique temporary UE identity (GUTI) to the user. GUTI can include the network identity of the operator, the MME group identifier, the MME code and a 32-bit user number called the MME Temporary Mobile Subscriber Identity (M-TMSI). The combination of MME code and the M-TMSI is referred to as System Architecture Evolution TMSI (S-TMSI), which is presented by a returning subscriber to the associated eNodeB of the eNodeB set.

At 301, the eNodeB selects the MME for attachment and for sending the message. The eNodeB uses the MME code in the S-TMSI to determine the correct MME to send the message to, which can be implemented for returning users. For a new user, either the S-TMSI does not exist or it was allocated by MME nodes in a different pool. In this case, the eNodeB selects one of the MME nodes in the pool based on the load-balancing algorithm on the eNodeB, or the MME is selected by other methods in accordance with the desired implementation.

At 302, the MME receives the Attach request for a new user. At 303 the MME selects one of the MME codes it is assigned to and creates a GUTI for the user using the MME code. For returning users, the MME keeps the existing MME code for the user. For a new user, the MME selects one of the MME codes to assign the GUTI for the user.

After the attach procedure is completed, the MME selects the standby MME for the user based on the MME code used for the GUTI. In the example illustrated for FIG. 3, MME code 13 is selected, therefore, the synchronization is to MME3. At 304, the standard attaching procedure is initiated between the primary MME (MME1) with the HSS and SGW and other network elements. At 305, the primary MME (MME1) then synchronizes the subscriber information with the standby or secondary MME (MME3) for the subscriber. In this example, the MME code 13 designates MME3 as the secondary subscriber, so MME1 synchronizes with MME3.

The example implementations thereby allow the subscribers on an MME to be backed up by all other MMEs in the pool. In the example of MME1, a sub-set of its subscribers are backed up on MME2 (for MME code 12); a sub-set of its subscribers are backed up on MME3 (for MME code 13) and the rest of its subscribers are backed up on MME4 (for MME code 14).

Table 1 below illustrates an example distribution of subscribers in the pool in steady operation state.

TABLE 1

Subscriber distribution and subscriber information

|  | MME1 | | | MME2 | | | MME3 | | | MME4 | | |
|---|---|---|---|---|---|---|---|---|---|---|---|---|
| Active MME code | 12 | 13 | 14 | 21 | 23 | 24 | 31 | 32 | 34 | 41 | 42 | 43 |
| Active user | User set 12 | User set 13 | User set 14 | User set 21 | User set 23 | User set 24 | User set 31 | User set 32 | User set 34 | User set 41 | User set 42 | User set 43 |
| Backup MME code | 21 | 31 | 41 | 12 | 32 | 42 | 13 | 23 | 43 | 14 | 24 | 34 |
| Backup user | User set 21 | User set 31 | User set 41 | User set 12 | User set 32 | User set 42 | User set 31 | User set 23 | User set 43 | User set 14 | User set 24 | User set 34 |

Each user is grouped into a set based on the MME code used. On each MME there are three sets of users linked to the MME codes it is assigned. Additionally, the MME also has three sets of users linked to the MME code it is backing up.

Figure 4:
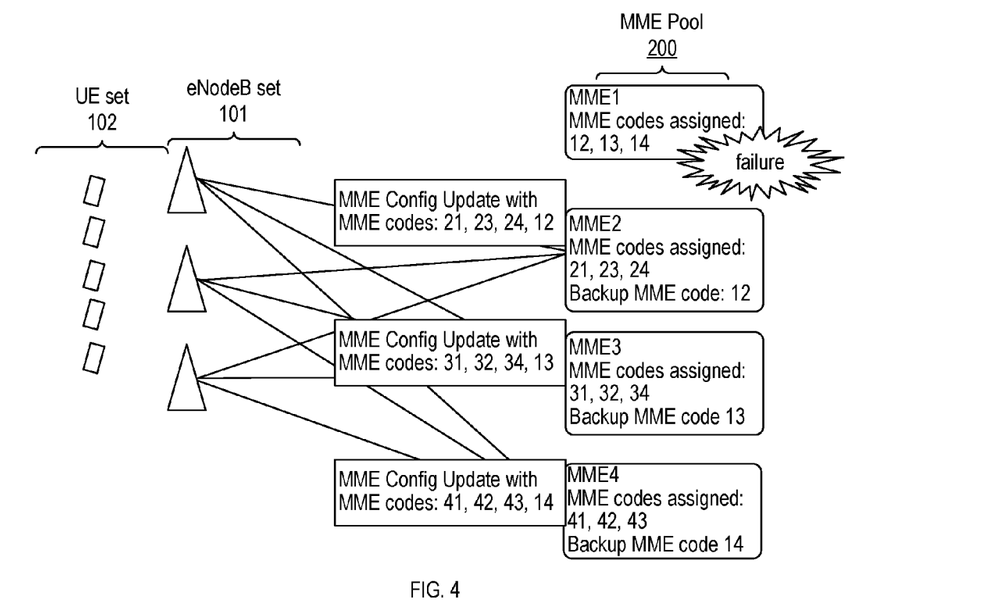
FIG. 4 illustrates an example of the network upon an MME failure, in accordance with an example implementation.

FIG. 4 illustrates an example of the network upon an MME failure, in accordance with an example implementation. Upon the failure of one MME (MME1), the other MME nodes in the pool (MME2, MME3, MME4) take over part of the failed MME based on the MME code. The synchronization procedure done during steady state as illustrated in FIG. 3 ensures that the subscriber information is ready on the backup MME nodes. The MME nodes therefore inform the peer network nodes of the takeover. The first type of nodes to notify is the eNodeBs in the eNodeB set 101. Example implementations can involve an S1 message that is already defined in the 3 GPP specification 36.413, namely the MME Configuration Update Request message. After that point, the eNodeBs will route the messages for the impacted subscribers to the backup MME nodes.

Using the example, MME2 backs up MME code 12 and notifies the eNodeBs with the MME Configuration Update Request message that includes its existing MME code 21, 23, 24 and newly acquired MME code 12. Since subscriber information related to MME code 12 has been synchronized to MME2 from the flow of FIG. 3, MME2 is ready to handle signaling messages for these subscribers. Similarly, MME3 and MME4 take over MME code 13 and 14 respectively.

On top of updating the eNodeBs to signal the takeover of the failed MME, the MME nodes also ensure that the other peer network nodes (e.g. the HSS and the SGW) are updated such that the service to the users are not impacted. For the HSS, example implementations can utilize a different MME hostname per MME code assigned to an MME node. In the example of FIG. 4, each MME uses three hostnames before the first MME fails. Upon the failure of the first MME (MME1), each of the hostnames that are linked to MME code 12, 13 and 14 is taken over by one of the remaining MME nodes. The MME that takes over the hostname informs its peers. Since the S6 interface between the MME and HSS uses the DIAMETER protocol, the MME can inform the peer, which can be the HSS itself or a DIAMETER agent, by creating a new connection and sends Capability Exchange Request (CER) using the hostname. This ensures the message from the HSS for any of the users reaches the correct MME after the failure.

For the SGW, multiple solutions are possible, depending on the desired implementation. One example implementation is to partition the control Tunnel End Point Identifier (TEID) based on the MME code such that each MME code used in the pool has its own range of TEIDs. Each TEID represents a Public Data Network (PDN) connection of the subscribers. When the backup MME takes over a MME code, it sends a single bulk update message to the SGW to take over the range of TEIDs linked to the MME code being taken over. The bulk update message informs the SGW that the MME side IP address for the TEID range has changed from the failed MME to the backup MME. The SGW can send future messages to the correct MME. Another example implementation involves the use of multiple IP addresses on the MME for the S11 interface, with one IP address for each MME code. This example implementation avoids the need to partition the TEID. When the backup MME takes over the MME code, it will use a new IP to take over the PDNs that are linked to the MME code being taking over. Again, a single bulk update message can be sent to SGW to replace the old MME S11 IP address that belong to the failed MME with a new MME S11 IP address that is taking over the PDNs.

Figure 5:
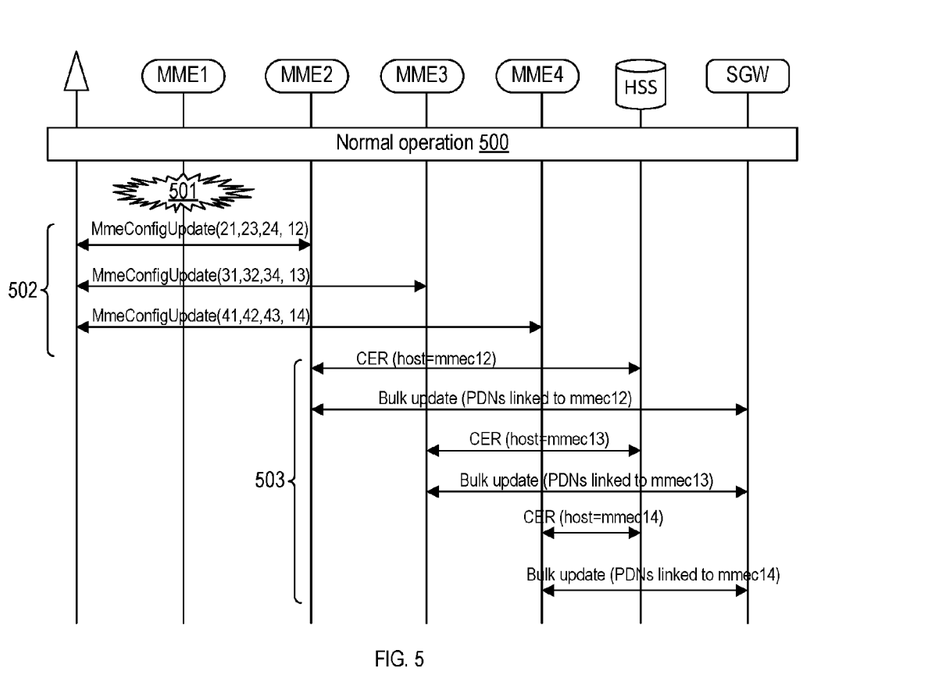
FIG. 5 illustrates a flow for handling network failure, in accordance with an example implementation.

FIG. 5 illustrates a flow for handling network failure, in accordance with an example implementation. At 500, the network is operating normally, wherein the MMEs of the MME pool synchronize their subscriber information accordingly as UEs are attached or moved. At 501, suppose a failure occurs at MME1. At 502, in response to the failure, an MME configuration update is initiated as described above for each of the failover or secondary MMEs. That is, MME2 updates the MME configuration to assume responsibility of MME code 12, MME3 updates the MME configuration to assume responsibility of MME code 13, and MME4 updates the MME configuration to assume responsibility of MME code 14, which is synchronized to the eNodeB set. At 503, each of the failover MMEs update the HSS and SGW with respect to the assumption of the MME code from the failed MME, according to the desired synchronization method (e.g. CER, bulk update, etc.). Table 2 illustrates the distribution of the subscribers in the pool at the end of the failover handling of FIG. 5.

Table 2

Subscriber information after failover

|  | MME1 | | | MME2 | | | MME3 | | | MME4 | | |
|---|---|---|---|---|---|---|---|---|---|---|---|---|
| Active MME code | Failed. | 21 | 23 | 24 | 12 | 31 | 32 | 34 | 13 | 41 | 42 | 43 | 14 |

Table 2-continued

| | MME1 | MME2 | MME3 | MME4 |
|---|---|---|---|---|
| | | Subscriber information after failover | | |
| Active user | User set 21 | User set 23, User set 24, User set 12, User set 31 | User set 32, User set 34, User set 13, User set 41 | User set 42, User set 43, User set 14 |
| Backup MME code | | 32, 42 | 23, 43 | 24, 34 |
| Backup user | | User set 32, User set 42 | User set 23, User set 43 | User set 24, User set 34 |

Table 3 illustrates an example of UE IDs associated with MME codes in accordance with an example implementation. In the example of Table 3, MME2 manages the UE IDs for user set 21, 23, 24 and 12 from the example of Table 2. MME2 may also receive subscriber information for user set 32 and 42, which designates MME2 as the secondary MME.

TABLE 3

MME code and UE IDs managed by MME

| User set | UE IDs |
|---|---|
| 21 | UE1, UE2, UE4, . . . |
| 23 | UE3, UE6, UE7, . . . |
| 24 | UE5, . . . |
| 12 | UE8, . . . |

Figure 6:
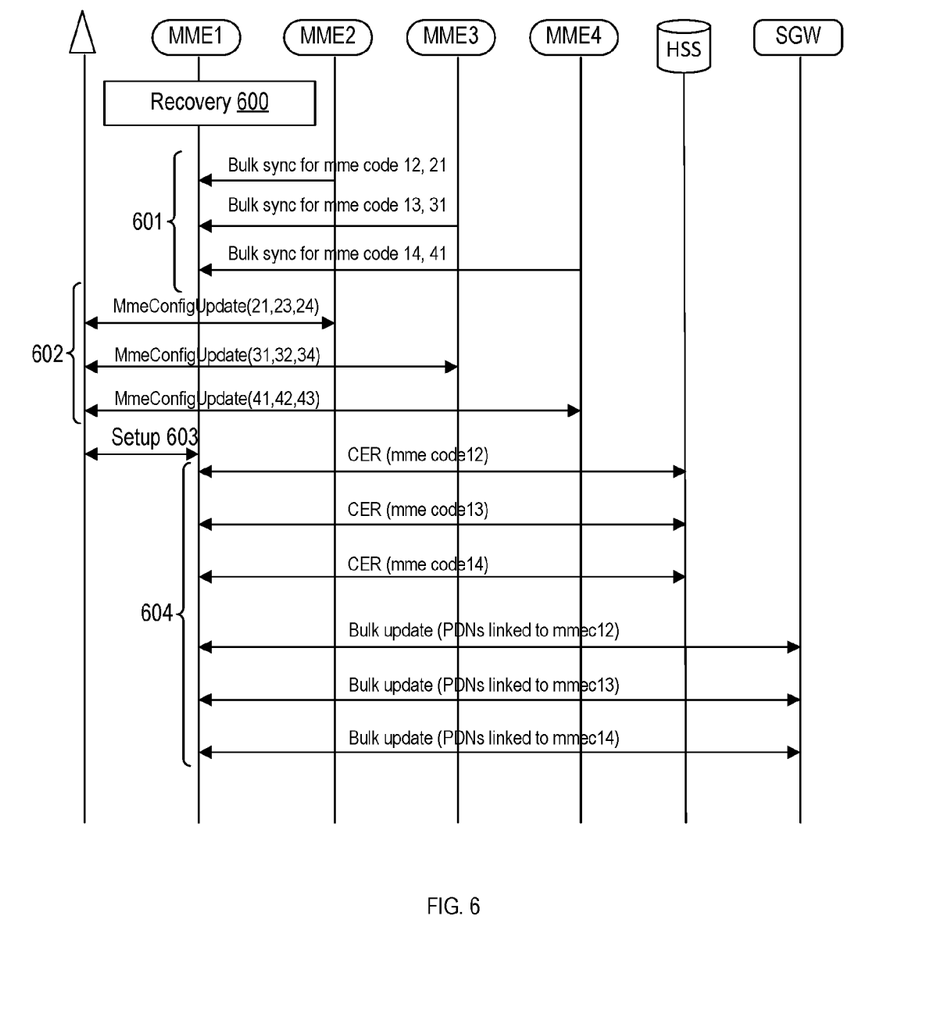
FIG. 6 illustrates a recovery flow for the network in accordance with an example implementation.

After the failed MME recovers, the MME can rejoin the MME pool. FIG. 6 illustrates a recovery flow for the network in accordance with an example implementation. The flow of FIG. 6 illustrates an example flow to move the subscribers back to the recovered MME.

At 600, the failed MME (MME1) completes the recovery process and informs the other elements of the network through the normal synchronization method, or through other methods depending on the desired implementation. At 601, the backup MME nodes are informed of the recovery of the failed MME, and perform bulk synchronization to send the subscriber information to the recovered MME. These include the subscribers to which the recovered MME shall be the primary MME, as well as the subscribers that the recovered MME shall be the backup MME. Using the example, after MME1 recovers, MME2 sends subscriber information linked to MME code 12 and MME code 21 to MME1. MME3 and MME4 conduct similar handover of subscriber information as MME2, as illustrated in FIG. 6.

At 602, after the synchronization is done, the backup MME nodes inform the eNodeBs to remove the MME codes that are going back to the recovered MME. The recovered MME also opens the S1 interface for connection and informs the eNodeBs about its MME codes using the standard S1 Setup Response Message at 603 (e.g. S1 Setup (mme code=12,13,14) for the example of FIG. 6). At 604, the recovered MME then updates the HSS and SGW to complete the procedure. After the recovery procedure, the network enters steady state. The subscriber distribution restores to the same state as illustrated in Table 1 before the failure. Synchronization between the MME nodes resumes.

The examples provided in this disclosure illustrate a method to prevent impact to user service in the case of a single MME node failure in a pool. However, the example implementations can be extended to cover more than one MME failure case. Specifically, for each MME code assigned to an MME node, there can be multiple backup MME nodes and synchronization from the active MME can be done towards the multiple backup MME nodes. The procedures used to handle the failure and recovery remains the same and can be extended as such depending on the desired implementation. In an example implementation, an MME code of MME 123 can indicate a tertiary backup MME (MME3) for the failure of both MME1 and MME2.

Figure 7:
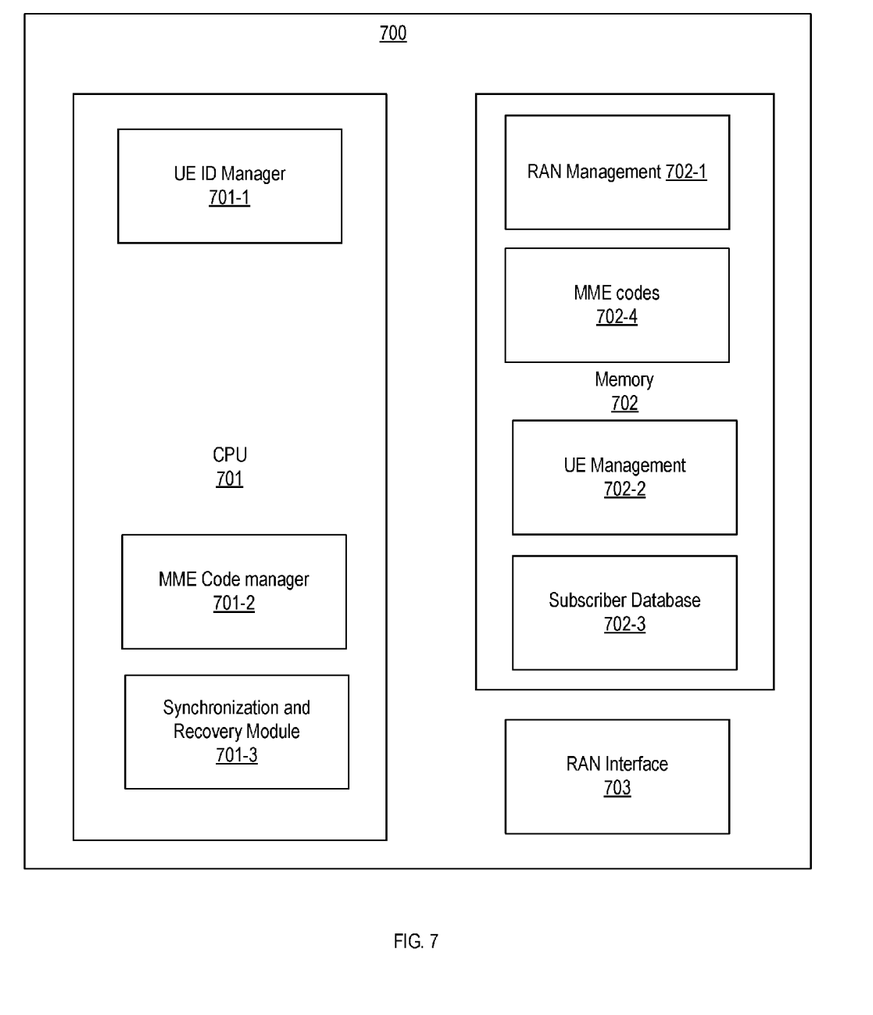
FIG. 7 illustrates an example apparatus, in accordance with an example implementation.

FIG. 7 illustrates an example apparatus, in accordance with an example implementation. The apparatus implementation may be in the form of a Mobility Management Entity (MME) or an equivalent device configured to perform the functions of an MME as illustrated in FIGS. 1 and 2, or a combination of devices thereof, and implemented in the form of a server or computer depending on the desired implementation. The apparatus 700 may include a CPU 701, a memory 702 and a radio access network (RAN) interface 703. The CPU 701 may invoke one or more functions that facilitate the apparatus to provide an MME pool and to facilitate management of MME codes and functionality as a primary MME and as a secondary MME as described in example implementations above. The memory 702 may be configured to store management information such as subscriber information regarding UEs that associate the apparatus 700 as the primary MME as well as information regarding UEs that associate the apparatus 700 as the secondary MME as illustrated in Table 1 and Table 2. RAN interface 703 can facilitate communications between the apparatus and other elements of the network architecture illustrated in FIGS. 1-6. Memory 702 may be configured to store a plurality of MME codes that are managed by the apparatus 700. Each of the plurality of MME codes can be indicative of a primary MME for a UE and a secondary MME for the UE as illustrated for each of the MME of Table 1. The CPU 701 may be a physical CPU or a virtual CPU based on desired implementation.

CPU 701 may include one or more functions such as UE ID manager 701-1. UE ID manager 701-1 may be configured to refer to Subscriber Database 702-3 in the memory 702 to manage UEs that are associated with the apparatus 700 so as to track which UE IDs associate the apparatus 700 as the primary MME and which UE IDs associate the apparatus 700 as the secondary MME. CPU 701 may also include other functions such as an MME Code manager 701-2 to manage the MME codes associated with the apparatus 700, and the Synchronization and Recovery Module 701-3 to initiate synchronization and recovery procedures as described in the present disclosure.

CPU 701 can be configured to retrieve the UE IDs corresponding to the UEs that associate the apparatus 700 as the primary UE from the subscriber database, as illustrated in Tables 1-3. CPU 701 can also be configured to provide the subscriber information to each secondary MME indicated in the plurality of MME codes as illustrated in Tables 1-3. For example, MME2 may be configured to provide subscriber information for MME code 21 to MME1. Similarly, CPU 701 is configured to retrieve subscriber information for a plurality of UE IDs corresponding to UEs that associate the apparatus 700 as the secondary MME as illustrated in Tables 1-3. For example MME2 may also retrieve subscriber information for MME code 12 from MME1. CPU 701 may also be configured to, on receipt of another MME code indicating the apparatus 700 as the secondary MME, manage UEs associated with UE IDs associated with the another MME code by updating its tables to track the MME code and the UE IDs as illustrated in Tables 1-3. CPU 701 may also be configured to provide an update to one or more packet data networks associated with the another MME code, and to provide a capability exchange request (CER) to an associated HSS to associate host capabilities associated with the another MME code to the MME.

During a failure of an MME, CPU 701 may be configured to receive an MME code indicating the apparatus 700 as the secondary MME and indicating a failed MME. Apparatus 700 may be configured to behave as the MME for the UEs during the failure of the primary MME. Upon recovery of the failed MME, CPU 701 may be configured to provide from the subscriber information ones of the plurality of UE IDs that associate the failed MME as the secondary MME to the failed MME upon recovery of the failed MME for updating purposes, and provide, from the subscriber information, ones of the plurality of UE IDs that associate the failed MME as the primary MME to the failed MME upon recovery of the failed MME and update the plurality of MME codes as illustrated in FIG. 6.

Apparatus 700 may also be communicatively coupled to a radio station configured to perform the functions of the eNodeB. The radio station may interact with the apparatus 700 to assign an MME code to a UE upon attachment of the UE to the radio station; and for the assigned MME code indicative of the MME being the secondary MME, update the subscriber information to the MME based on the attached UE.

Memory 702 may manage information such as RAN management 702-1, UE Management 702-2, and subscriber database 702-3. RAN management may indicate a list of RANs associated by the apparatus 700, such as the IDs of the eNodeBs within the eNodeB set as illustrated in FIGS. 1-6. UE Management 702-2 can include UE latency and throughput information for the UEs managed by the apparatus 700, as well as other information such as those described in Table 1 and Table 2.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A mobility management entity (MME), comprising:
   a memory storing a plurality of MME codes, each of the plurality of MME codes comprising a first portion indicative of a primary MME for a user equipment (UE) and a second portion indicative of a secondary MME for the UE; and a processor, configured to:
  retrieve first subscriber information comprising a plurality of first UE identifiers (IDs) corresponding to UEs that associate the MME as the primary MME;
  provide the first subscriber information to each secondary MME indicated in the plurality of MME codes;
  retrieve second subscriber information comprising a plurality of second UE IDs corresponding to UEs that associate the MME as the secondary MME; and
  upon the MME taking over for another MME, provide a capability exchange request (CER) to an associated HSS to associate host capabilities associated with the another MME to the MME.

2. The MME of claim 1, wherein the processor is configured to, on receipt of another MME code indicating the MME as the secondary MME, manage UEs associated with UE IDs of the plurality of second UE IDs associated with the another MME code.

3. The MME of claim 1, wherein the processor is configured to, on receipt of another MME code indicating the MME as the secondary MME, provide an update to one or more packet data networks associated with the another MME code.

4. The MME of claim 1, wherein the processor is configured to, on receipt of another MME code indicating the MME as the secondary MME and indicating a failed MME:
  provide, from the first subscriber information, one of the plurality of first UE IDs that associate the failed MME as the secondary MME to the failed MME upon recovery of the failed MME;
  provide, from the second subscriber information, one of the plurality of second UE IDs that associate the failed MME as the primary MME to the failed MME upon recovery of the failed MME; and
  update the plurality of MME codes.

5. The MME, of claim 1, wherein the MME is communicatively coupled to a radio station configured to:
  assign an MME code to a UE upon attachment of the UE to the radio station;
  for the assigned MME code indicative of the MME being the secondary MME, update the second subscriber information to the MME based on the attached UE.

6. The MME of claim 1, wherein upon recovery from failure of the MME, the processor is configured to:
  update the first subscriber information and the second subscriber information from one or more other MMEs; and
  manage UEs associated with the plurality of first UE IDs indicated in the updated first subscriber information.

7. A method for a mobility management entity (MME), comprising:
  managing a plurality of MME codes, each of the plurality of MME codes comprising a first portion indicative of a primary MME for a user equipment (UE) and a second portion indicative of a secondary MME for the UE;
  retrieving first subscriber information comprising a plurality of first UE identifiers (IDs) corresponding to UEs that associate the MME as the primary MME;
  providing the first subscriber information to each secondary MME indicated in the plurality of MME codes;
  retrieving second subscriber information comprising a plurality of second UE IDs corresponding to UEs that associate the MME as the secondary MME; and
  upon the MME taking over for another MME, providing a capability exchange request (CER) to an associated HSS to associate host capabilities associated with the another MME to the MME.

8. The method of claim 7, further comprising, on receipt of another MME code indicating the MME as the secondary MME, managing UEs associated with UE IDs of the plurality of second UE IDs associated with the another MME code.

9. The method of claim 7, further comprising, on receipt of another MME code indicating the MME as the secondary MME, providing an update to one or more packet data networks associated with the another MME code.

10. The method of claim 7, further comprising, on receipt of another MME code indicating the MME as the secondary MME and indicating a failed MME:
  providing, from the first subscriber information, one of the plurality of first UE IDs that associate the failed MME as the secondary MME to the failed MME upon recovery of the failed MME;
  providing, from the second subscriber information, one of the plurality of second UE IDs that associate the failed MME as the primary MME to the failed MME upon recovery of the failed MME; and
  updating the plurality of MME codes.

11. The method of claim 7, wherein the MME is communicatively coupled to a radio station configured to:
  assign an MME code to a UE upon attachment of the UE to the radio station;
  for the assigned MME code indicative of the MME being the secondary MME, update the second subscriber information to the MME based on information received from the primary MME of the attached UE.

12. The method of claim 7, further comprising, upon recovery from failure of the MME:
  updating the first subscriber information and the second subscriber information from one or more other MMEs; and
  managing UEs associated with the plurality of first UE IDs indicated in the updated first subscriber information.

13. A non-transitory computer readable medium storing instructions for executing a process for a mobility management entity (MME), the instructions comprising:
  managing a plurality of MME codes, each of the plurality of MME codes comprising a first portion indicative of a primary MME for a user equipment (UE) and a second portion indicative of a secondary MME for the UE;
  retrieving first subscriber information comprising a plurality of first UE identifiers (IDs) corresponding to UEs that associate the MME as the primary MME;
  providing the first subscriber information to each secondary MME indicated in the plurality of MME codes; and
  retrieving second subscriber information comprising a plurality of second UE IDs corresponding to UEs that associate the MME as the secondary MME; and
  upon the MME taking over for another MME, providing a capability exchange request (CER) to an associated HSS to associate host capabilities associated with the another MME to the MME.

14. The non-transitory computer readable medium of claim 13, the instructions further comprising, on receipt of another MME code indicating the MME as the secondary MME, managing UEs associated with UE IDs of the plurality of second UE IDs associated with the another MME code.

15. The non-transitory computer readable medium of claim 13, the instructions further comprising, on receipt of another MME code indicating the MME as the secondary MME, providing an update to one or more packet data networks associated with the another MME code.

16. The non-transitory computer readable medium of claim 13, the instructions further comprising, on receipt of another MME code indicating the MME as the secondary MME and indicating a failed MME:
provide, from the first subscriber information, one of the plurality of first UE IDs that associate the failed MME as the secondary MME to the failed MME upon recovery of the failed MME;
providing, from the second subscriber information, one of the plurality of second UE IDs that associate the failed MME as the primary MME to the failed MME upon recovery of the failed MME; and
updating the plurality of MME codes.

17. The non-transitory computer readable medium of claim 13, wherein the MME is communicatively coupled to a radio station configured to:
assign an MME code to a UE upon attachment of the UE to the radio station;
for the assigned MME code indicative of the MME being the secondary MME, update the second subscriber information to the MME based on the attached UE.

18. The non-transitory computer readable medium of claim 13, the instructions further comprising, upon recovery from failure of the MME:
updating the first subscriber information and the second subscriber information from one or more other MMEs; and
managing UEs associated with the plurality of first UE IDs indicated in the updated first subscriber information.

19. The non-transitory computer readable medium of claim 13, further comprising, upon a new UE attaching to the MME:
selecting an MME code from the plurality of MME codes indicating the MME as the primary MME,
assigning the selected MME code to the new UE;
synchronizing the first subscriber information with the secondary MME indicated in the selected MME code.

20. The non-transitory computer readable medium of claim 13, wherein upon detection of taking over for the another MME, updating a radio station with an MME code of the plurality of MME code having the another MME as the primary MME and the MME as the secondary MME, through an MME configuration update.

* * * * *